United States Patent
Dixon et al.

(10) Patent No.: US 8,895,897 B2
(45) Date of Patent: Nov. 25, 2014

(54) HEATABLE GLAZING

(75) Inventors: Jonathan Barclay Dixon, Ormskirk (GB); Mark Andrew Chamberlain, Ormskirk (GB)

(73) Assignee: Pilkington Group Limited, Lancashire (GB)

(*) Notice: Subject to any disclaimer, the term of this patent is extended or adjusted under 35 U.S.C. 154(b) by 151 days.

(21) Appl. No.: 13/502,708

(22) PCT Filed: Oct. 18, 2010

(86) PCT No.: PCT/GB2010/051744
§ 371 (c)(1),
(2), (4) Date: Apr. 18, 2012

(87) PCT Pub. No.: WO2011/048407
PCT Pub. Date: Apr. 28, 2011

(65) Prior Publication Data
US 2012/0199569 A1 Aug. 9, 2012

(30) Foreign Application Priority Data

Oct. 19, 2009 (GB) .................................. 0918228.8

(51) Int. Cl.
*H05B 1/00* (2006.01)
*H05B 3/84* (2006.01)
*B60L 1/02* (2006.01)

(52) U.S. Cl.
CPC ............ *H05B 3/84* (2013.01); *H05B 2203/016* (2013.01); *H05B 2203/031* (2013.01)
USPC ............................ 219/201; 219/203; 219/219

(58) Field of Classification Search
USPC ......... 219/201, 203, 528, 549, 543, 509, 522, 219/541, 219
See application file for complete search history.

(56) References Cited

U.S. PATENT DOCUMENTS

| | | | |
|---|---|---|---|
| 3,467,818 A * | 9/1969 | Ballentine | 219/522 |
| 4,004,126 A | 1/1977 | Boaz | |
| 4,109,133 A | 8/1978 | Hanle et al. | |
| 4,373,130 A | 2/1983 | Krasborn et al. | |
| 4,388,522 A * | 6/1983 | Boaz | 219/522 |
| 4,410,843 A | 10/1983 | Sauer et al. | |
| 4,513,196 A | 4/1985 | Bartelsen et al. | |
| 4,644,139 A | 2/1987 | Harrison et al. | |
| 4,673,609 A | 6/1987 | Hill | |

(Continued)

FOREIGN PATENT DOCUMENTS

| | | |
|---|---|---|
| DE | 10 2007 008833 A1 | 8/2008 |
| EP | 0 876 083 A2 | 11/1998 |
| GB | 2146880 A | 4/1985 |

OTHER PUBLICATIONS

International Search Report (PCT/ISA/210) issued on Feb. 1, 2011, by European Patent Office as the International Searching Authority for International Application No. PCT/GB2010/051744.

(Continued)

*Primary Examiner* — Shawntina Fuqua
(74) *Attorney, Agent, or Firm* — Buchanan Ingersoll & Rooney

(57) ABSTRACT

A heatable glazing is disclosed in which electrical heating elements such as fine wires are connected to a busbar. The resistance of the busbar is chosen such that, at the supply voltage of the installation, the busbar provides heating of a portion of the glazing in which it is located.

15 Claims, 3 Drawing Sheets

(56) References Cited

U.S. PATENT DOCUMENTS

| | | |
|---|---|---|
| 4,845,344 A | 7/1989 | Price et al. |
| 4,910,380 A | 3/1990 | Reiss et al. |
| 4,971,848 A | 11/1990 | Ruelle et al. |
| 5,182,431 A | 1/1993 | Koontz et al. |
| 5,386,098 A | 1/1995 | Knudsen |
| 5,390,595 A | 2/1995 | Cutcher |
| 5,451,280 A | 9/1995 | Gillner |
| 5,653,903 A | 8/1997 | Pinchok, Jr. et al. |
| 5,796,071 A | 8/1998 | Morin et al. |
| 5,798,499 A | 8/1998 | Shibata et al. |
| 5,861,606 A | 1/1999 | Castle et al. |
| 5,877,473 A | 3/1999 | Koontz |
| 6,011,244 A | 1/2000 | Castle et al. |
| 6,137,086 A | 10/2000 | Williams, Jr. |
| 6,204,480 B1 * | 3/2001 | Woodard et al. ............ 219/203 |
| 2010/0270280 A1 | 10/2010 | Blanchard et al. |

OTHER PUBLICATIONS

United Kingdom Search Report dated Feb. 4, 2010, issued in corresponding United Kingdom Patent Application No. GB0918228.8. (1 page).

* cited by examiner

HEATABLE GLAZING

The present invention relates to heatable glazings and in particular to heatable glazings having a portion in need of rapid heating.

Glazings which are heated by the passage of electric current through a resistive heating element disposed on the window are often provided for the purpose of restoring or maintaining vision through the window where vision has been, or may be, reduced by condensation, frost, ice or snow. Terms such as "demisting", "defogging" or "deicing" are often used to describe the action of the heating element, and such windows have found particular application in vehicles, especially road vehicles, although their use is not limited thereto. Applications also exist in the doors of freezer display cabinets, and in windows for ships, trains and aircraft, for example.

Obviously, the area of the window heated by the heating element (the "heated area") needs to cover the area through which it is desired to restore or maintain vision (the "vision area"). This generally comprises a substantial part of the window, and in some applications it may comprise the whole of the transparent portion of the window (some windows having an opaque portion for aesthetic or other reasons). Resistive heating elements are also used to provide a heated area where a window wiper may rest when not in use, to prevent the wiper freezing to the window in cold conditions. Such an area is generally termed a heater wiper rest area (or a heated wiper parking area), and it may add to the area heated for reasons of maintaining vision; alternatively a heated wiper rest area may be provided on its own in which case the heated area is smaller.

The resistive heating element may comprise a thin transparent electrically conductive layer (such as a coating) on the window, or it may comprise an array of fine electrical conductors which extend across the window. The conductors may be fine wires, or alternatively lines printed in an electrically conductive ink. Electrical connection to the heating element is normally made by wider conductors known as busbars, which are adapted to carry substantial currents. It is a widespread safety requirement that in use no exposed part of the circuit may exceed a temperature of 60 to 70° C. In particular, a high resistance portion of a busbar that is carrying a considerable current is likely to overheat and constitute a danger, e.g. to the occupants of a vehicle, as well as consume power which could more usefully be dissipated elsewhere, such as in the vision area. For this reason and to improve electrical efficiency, high resistance busbars are not used.

At its simplest, an electrically heated window may comprise a heating element and a pair of spaced opposed busbars, normally one on each of two opposed sides of a face of the window, with the heating element extending between them over the vision area. Electrical connection to an external power source, for example the wiring loom of a vehicle, may be made by plug and socket connectors of known type, the plug part of which is generally soldered or otherwise adhered to the busbar.

EP-A-0876 083 relates to a heated window where the heating element(s) and associated connections of electrically heated windows are configured so as to leave a selected area of the window free, e.g. for the provision of an additional item of equipment, while still providing a window that is acceptable both aesthetically and technically. This is achieved by using busbar portions of different widths in appropriate combinations.

More complicated circuits are known, comprising a number of resistive heating elements. For instance, U.S. Pat. No. 5,182,431 discloses an electrically heated window having at least three heating elements, at least one of which may be heated faster and to a higher temperature than the others. The various heating elements are connected in series by busbars. U.S. Pat. No. 4,513,196 discloses a heatable windshield which has one heatable zone which can be heated faster than another.

Unfortunately, the known methods of providing heatable glazings are complex, especially where a portion or zone of the glazing can be heated faster that the major or other portions of the glazing. This results in expense, may result in less efficient production of the glazings and leads to difficulties in ensuring that the heatable glazings are robust.

It is an aim of the present invention to address these problems and to provide a simple means of heating a glazing.

The present invention accordingly provides a heatable glazing comprising a pane of glazing material, and at least one high resistance busbar disposed on the pane.

Preferably, the high resistance busbar is disposed in a first portion of the pane in need of rapid heating. The first portion may be, in general, any area of the pane. In vehicles (especially road vehicles such as cars) the first portion may, advantageously, be the wiper rest area.

Generally, and especially if it is a wiper rest area, the first portion may be in the lower (i.e. when installed) portion of the pane.

Preferably, the high resistance busbar extends across the lower portion of the pane in the wiper rest area so that it may act as a heating element for rapidly and efficiently heating the rest area when needed.

The high resistance busbar may be formed from conductive ink (e.g. silver particles in a glass frit especially where the pane is of glass) or metallic strip (e.g. tinned copper strip).

Preferably, the high resistance busbar has a predetermined resistance per unit length of between 0.25 and 0.04Ω/m, more preferably between 0.2 and 0.041Ω/m and most preferably between 0.17 and 0.0425Ω/m. A typical resistance per unit length is between 0.08 and 0.045Ω/m, for example 0.0680Ω/m. The predetermined resistance of the busbar will be determined by the power available from the power supply and the heating rate and temperature required. Generally, the predetermined resistance may be adjusted by changing the resistivity of the material used for making the high resistance busbar, by changing the width, depth and length of the busbar and also its shape.

Preferably, the high resistance busbar will be generally elongate, extending across the pane. If made of conductive ink (with typical resistivity of 4 mΩ per square) then the busbar will generally be less than 100 mm in width, preferably between 20 and 90 mm in width. The high resistance busbar will generally be between 20 and 200 cm in length, preferably between 50 and 100 cm in length.

Where it is desired to produce a glazing with different heatable zones then preferably the heatable glazing will further comprise at least further busbar. Preferably, the further busbar will be a low resistance busbar.

Generally, the high and further busbars will be disposed near to each other on the pane, preferably on the same side of the pane.

The low resistance busbar will generally have a resistance of less than 0.03Ω/m, preferably less than 0.025Ω/m and most preferably less than 0.0213Ω/m. If made of copper strip, this would mean that the low resistance busbar would generally have a width of approximately 6 to 10 mm, preferably, 7 to 9 mm and most preferably about 8 mm (depth would be preferably between 50 and 200 microns, preferably 70 to 150 microns and length preferably between 50 and 100 cm).

Preferably, the low resistance busbar comprises a metallic strip, preferably a copper strip and it is preferred if the high resistance busbar comprises a conductive ink.

In order to provide an electrically efficient system that can heat two or more zones, the high resistance busbar and the further (preferably low resistance) busbar may be electrically connectable to a resistive heating element for heating the glazing. Preferably, the high resistance busbar and the further (preferably low resistance)' busbar are independently electrically connectable to a resistive heating element for heating the glazing. Independent connectability is advantageous because it allows the heating of the portion of the glazing in which the high resistance busbar is disposed (when the high resistance busbar is connected). When the low resistance busbar (or both the high and the low resistance busbars) are connected it allows heating of the other portion of the pane over which the resistive heating element extends.

Preferably, where the glazing comprises a resistive heating element, this comprises an array of fine electrical conductors extending across the pane. The conductors may be lines printed in a conductive ink (such as a silver-containing frit) which is fired onto the glass surface, or they may be thin wires, e.g. of tungsten. Generally, printed lines in conductive ink are preferred for a glazing comprising a pane wholly of tempered glass. A preferred printing technique is screen-printing, although other printing techniques may be used in desired.

Thin wires are usually more preferred where the pane comprises a laminate, since the wires may be positioned between two of the plies making up the laminate, and thereby fixed in position.

The conductors may extend over the pane from side to side or they may extend from top to bottom, whichever suits the shape of the pane better.

The thickness of the conductors may be varied to alter their resistance. For instance, if printed, the conductors may be printed in different widths, typically in the range from 0.4 mm to 1.0 mm. Where the conductors are wires, different thicknesses of wire may be used, typically in the range of 15 to 50 microns. Conductor resistance may be varied to preferentially heat certain areas of the window, or to balance the combined resistance of different groups of unequal numbers of conductors to produce a more uniform heating effect.

The resistive heating element will usually have at least one additional busbar at the side of the element distant from the low resistance and high resistance busbars.

The, or each, busbar (either the high or the low resistance busbar) may be printed in conductive ink, which is preferred if the conductors are formed in the same way. Alternatively, when the conductors are fine metal wires, the busbars may be printed in conductive ink or formed from metal strip, e.g. tinned copper strip.

Busbars (especially printed busbars) may be tapered or stepped, especially towards their ends. Consequently, references in this specification to busbar width are, unless the context indicates otherwise, references to the width of a part of a busbar (or busbar portion) which is of constant width. Local variations in width, especially a local widening, should be ignored. In the absence of any substantial busbar part of constant width, the reference should be taken to be to the average width of a part of a busbar (or busbar portion). Obviously, the widths of relatively wide and relatively narrow busbar portions are to be considered separately.

Busbars made from metal strip, e.g. tinned copper strip, need not be as wide as those produced from conductive ink because metal strip materials have an inherently greater conductivity.

The pane may be any sheet glazing material, e.g. glass or plastics or a composite of either or both materials. The pane may further be flat or curved, and/or body-tinted or coated; it may also be a laminate of a number of plies of glass and plastics. The pane may in particular be of tempered glass.

Generally, the power density of the high resistance busbar, during heating, will be in the range 400 to 4000 $Wm^{-2}$.

The heatable glazings of the present invention have uses in all areas where glazings are needed; they have found particular application in vehicles, especially road vehicles, although their use is not limited thereto. Applications also exist in the doors of freezer display cabinets, and in windows for ships, trains and aircraft, for example.

In all embodiments of the invention, the glazing is associated with a power supply providing a supply voltage. The high resistance busbar has a resistance value such that the busbar is suitable for heating the glazing on application of that voltage, more particularly for heating the glazing to a degree that provides for demisting or de-icing of the glazing.

Embodiments of the present invention will now be described with reference to the accompanying drawings in which.

Figure 1:
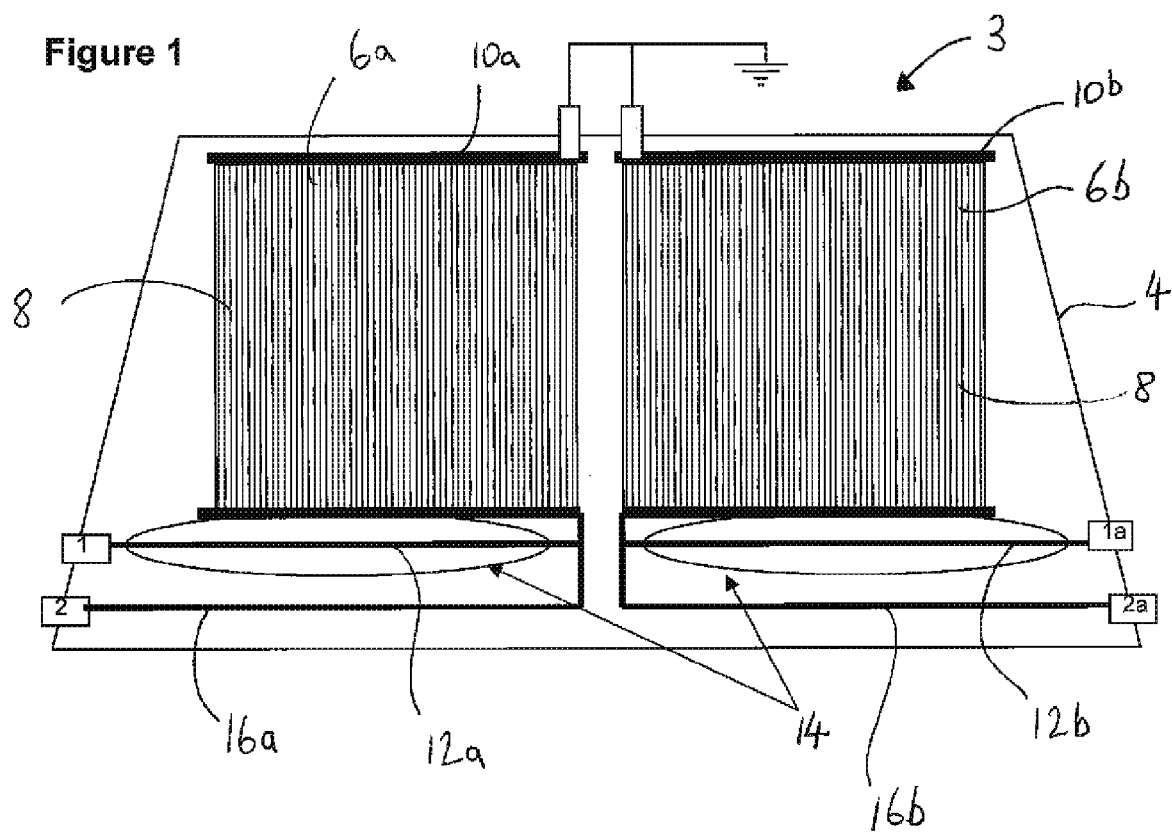
FIG. 1 illustrates schematically a first configuration of a heatable glazing according to the invention.

A first configuration 3 of a heatable glazing is shown in FIG. 1. The glazing is a laminated windshield 4 for a vehicle, for example a car. Two resistive heating elements 6a, 6b extend across the centre of the windshield 4. Each of the resistive heating elements 6a, 6b comprises conductive strips 8 which heat the windshield 4 when current passes through them. The conductive strips 8 may be printed on the windshield (typically on surface 4 of the laminate, i.e. the surface facing the interior of the vehicle) using a conductive ink (e.g. silver particles in a glass frit). Alternatively, the conductive strips 8 may be metallic wires situated in the interior of the laminate (next to the plastics interlayer).

At the top of the windshield 4, there are two top busbars 10a, 10b which connect the two resistive heating elements 6a, 6b respectively to earth.

Two high resistance busbars 12a, 12b connected to the two resistive heating elements 6a, 6b respectively are situated towards the bottom of the windshield 4 in the wiper rest areas 14. Also towards the bottom of the windshield, and below the high resistance busbars 12a, 12b, are two low resistance busbars 16a, 16b also connected to the two resistive heating elements 6a, 6b respectively. The high resistance busbars 12a, 12b and the low resistance busbars 16a, 16b may be independently connected to the electricity (power) supply of the vehicle (not shown) through contacts 1,1a and 2, 2a respectively.

In order to heat the wiper rest area 14, the high resistance busbars 12a, 12b are electrically connected using contacts 1, 1a. This also has the result of heating the resistive heating elements 6a, 6b for full area de-ice.

For full area de-ice only, either all contacts 1,1a, and 2, 2a may be electrically connected to the power supply, or only contacts 2 and 2a to the low resistance busbars 16a, 16b.

Figure 2:
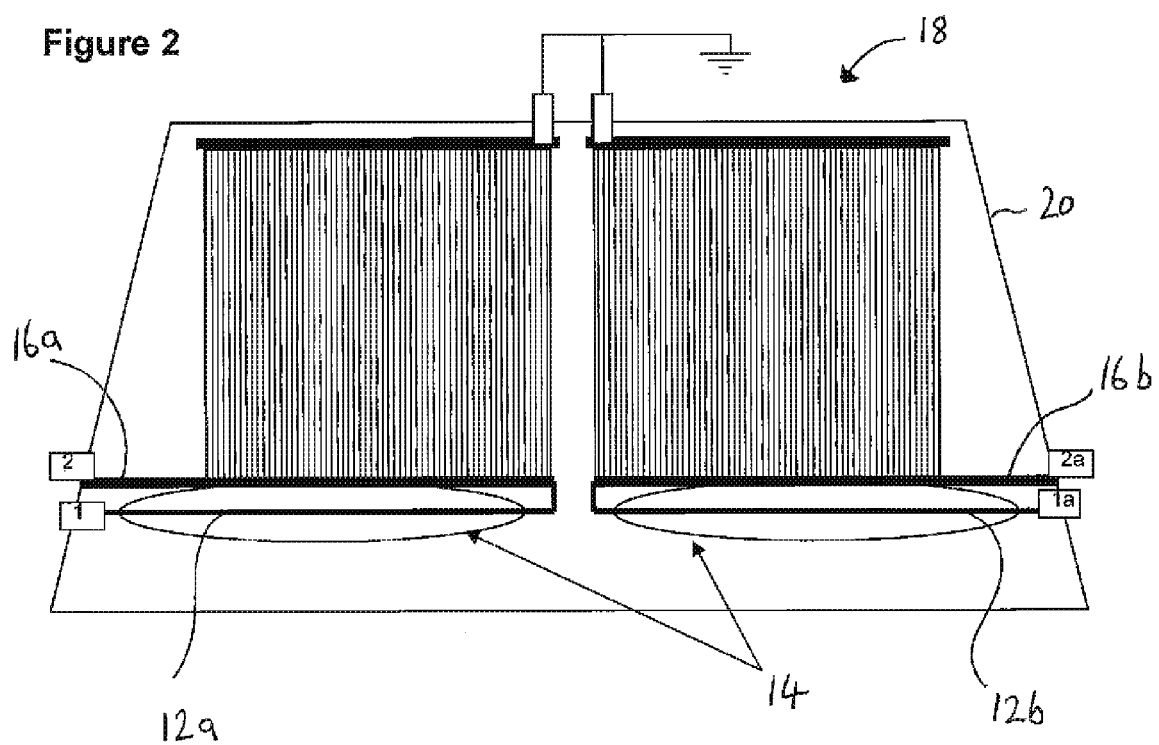
FIG. 2 illustrates schematically a second configuration of a heatable glazing according to the invention.

A second configuration of the heatable laminated windshield 20 is shown in FIG. 2. This is similar to the first configuration 3 of FIG. 1, except that the high resistance busbars 12a, 12b are situated below the low resistance busbars 16a, 16b towards the bottom of the windshield 20. Again, the high resistance busbars 12a, 12b are situated in the wiper rest areas 14.

Figure 3:
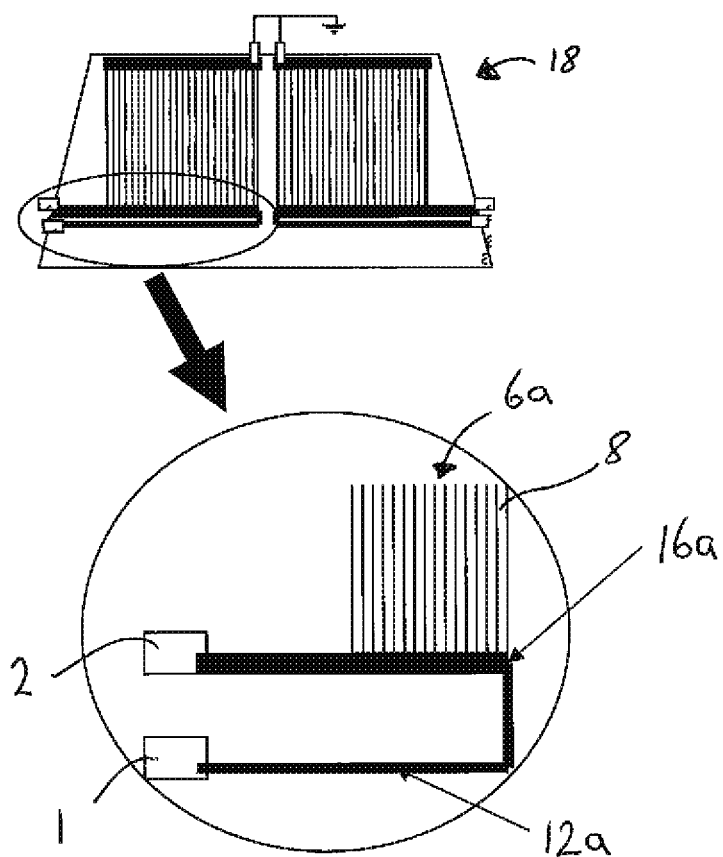
FIG. 3 illustrates schematically a detail of the high resistance busbar of the invention in the configuration illustrated in FIG. 2.

FIG. 3 shows a detail of the high 12a and low resistance busbars 16a of one of the resistive heating elements 6a with conductive strips 8 of the heatable glazing 18 illustrated in FIG. 2. The high resistance busbar 12a is narrower (4 mm wide, 50 microns thick) than the low resistance busbar 16a (8 mm wide, 100 microns thick). The busbars are both formed by copper strips and because the high resistance busbar 12a is thinner it has significantly higher resistance than the low resistance busbar 16a.

The invention claimed is:

1. A heatable glazing comprising,
   a pane of glazing material;
   at least one high resistance busbar disposed on the pane;
   at least one further busbar;
   the high resistance busbar and the further busbar being independently electrically connectable to a resistive heating element for heating the glazing; and
   the high resistance busbar having a predetermined resistance per unit length of between 0.25 and 0.04 Ω/m.

2. A heatable glazing as claimed in claim 1, wherein the high resistance busbar is disposed in a first portion of the pane in need of rapid heating.

3. A heatable glazing as claimed in claim 2, wherein the first portion of the pane is the wiper rest area.

4. A heatable glazing as claimed in claim 2, wherein the first portion of the pane is the lower portion of the pane or the first portion of the pane is a first side portion of the pane.

5. A heatable glazing as claimed in claim 1, wherein the high resistance busbar is formed from conductive ink or metallic strip.

6. A heatable glazing as claimed in claim 1, wherein the further busbar is a low resistance busbar.

7. A heatable glazing as claimed in claim 6, wherein the low resistance busbar comprises a metallic strip, preferably a copper strip.

8. A heatable glazing as claimed in claim 1, wherein the resistive heating element comprises an array of fine electrical conductors extending across the pane.

9. A heatable glazing as claimed in claim 1, wherein the pane comprises a laminate having at least two glass plies and at least one plastics ply.

10. A heatable glazing as claimed in claim 1, wherein the pane comprises tempered glass.

11. A heatable glazing as claimed in claim 1, wherein the power density of the high resistance busbar, during heating, is in the range 400 to 4000 $Wm^{-2}$.

12. A heatable glazing comprising,
    a pane of glazing material;
    at least one relatively higher resistance busbar disposed on the pane;
    at least one relatively lower resistance busbar disposed on the pane and spaced apart from the relatively higher resistance busbar; and
    the relatively higher resistance busbar having a relatively higher resistance than the relatively lower resistance busbar.

13. A heatable glazing as claimed in claim 12, wherein the relatively higher resistance busbar has a predetermined resistance per unit length of between 0.25 and 0.04 Ω/m.

14. A heatable glazing as claimed in claim 12, wherein
    the pane of glazing material has an upper edge side and a lower edge side, the upper edge side being spaced apart from the lower edge side and being relatively smaller in length than the lower edge side, and
    the relatively higher resistance busbar is located closer to the lower edge side than the upper edge side.

15. A heatable glazing as claimed in claim 12, wherein the relatively higher resistance busbar and the relatively lower resistance busbar are independently electrically connectable to a resistive heating element for heating the glazing.

* * * * *